United States Patent [19]

Blacklaw

[11] Patent Number: 5,312,128
[45] Date of Patent: May 17, 1994

[54] DUAL USE TRAILER COUPLING

[75] Inventor: Rocky A. Blacklaw, Mulino, Oreg.

[73] Assignee: Premier Equipment, Inc., Portland, Oreg.

[21] Appl. No.: 837,022

[22] Filed: Feb. 14, 1992

[51] Int. Cl.[5] .......................................... F16C 11/06
[52] U.S. Cl. ................................. 280/512; 280/514; 403/3
[58] Field of Search ............... 280/504, 511, 514, 512; 403/3, 122, 315

[56] References Cited

U.S. PATENT DOCUMENTS

| | | | |
|---|---|---|---|
| 3,779,653 | 12/1973 | Charlton | 280/512 |
| 3,820,823 | 6/1974 | Beaston | 280/512 |
| 3,963,266 | 6/1976 | Thelin | 280/504 |
| 4,778,196 | 10/1988 | Spoliansky | 280/512 |

Primary Examiner—Robert J. Oberleitner
Assistant Examiner—Clifford T. Bartz
Attorney, Agent, or Firm—Chernoff, Vilhauer, McClung & Stenzel

[57] ABSTRACT

A trailer coupling has a removable unitary coupler-receiving element that includes both a ball configured to receive a spherical cavity coupler and a cylindrical neck configured to receive a drawbar eye. A latch is movable about a vertical axis between a closed position, where it engages the coupler-receiving element, and prevents removal of the eye from the neck, and an open position where it is separated from the coupler-receiving element and permits use of the ball. A locking mechanism locks the latch in its closed position and holds it against free movement from its open position. A trigger located in a finger-receiving cavity in the latch releases the locking mechanism. Because the latch rotates about a vertical axis, it can have a low profile and not extend substantially above the ball in the orientation.

6 Claims, 1 Drawing Sheet

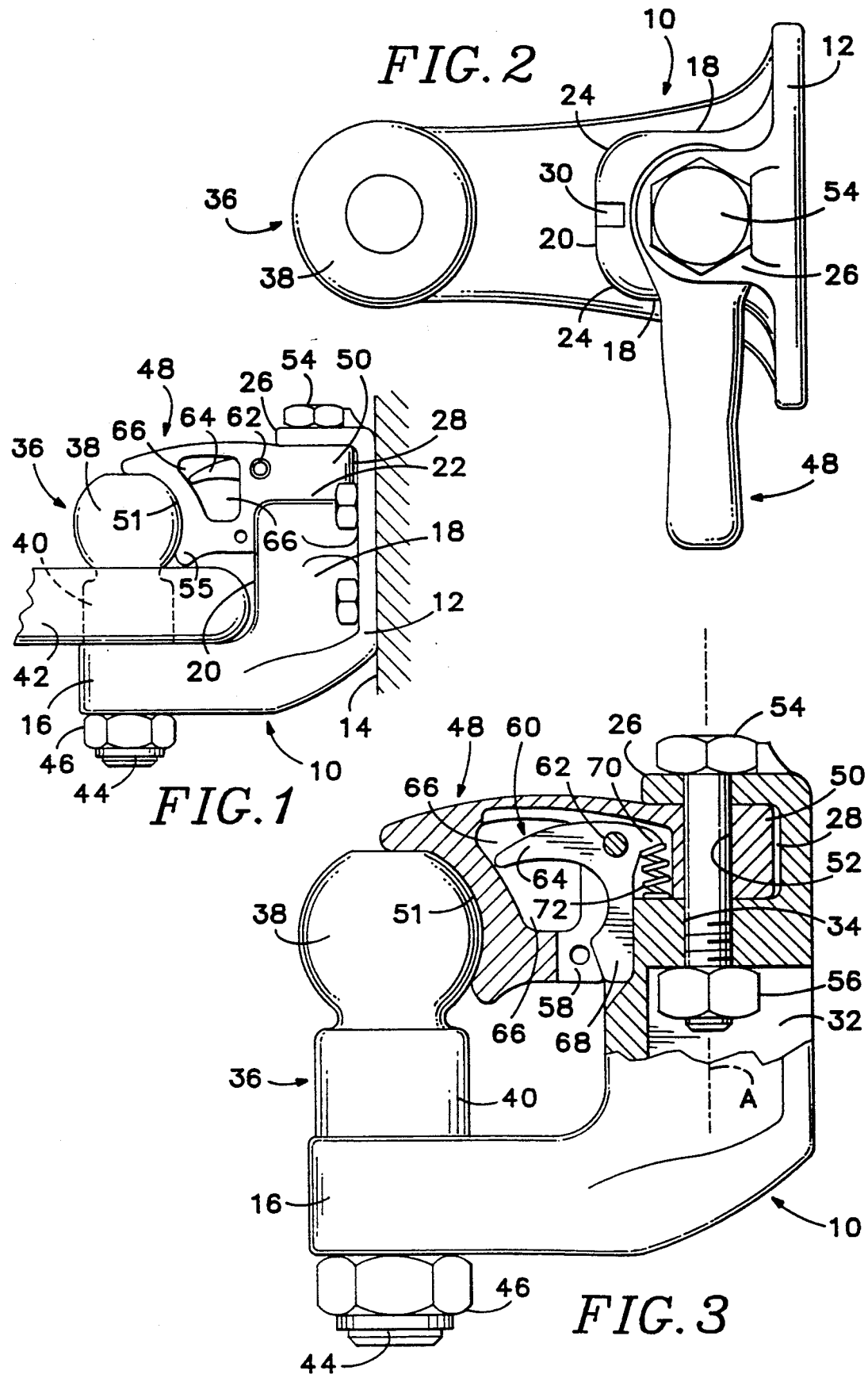

5,312,128

DUAL USE TRAILER COUPLING

BACKGROUND AND SUMMARY OF THE INVENTION

This invention relates to a trailer coupling that will receive both a spherical cavity coupler and a drawbar eye.

There are two types of trailer couplings that are commonly used. For light loads a spherical cavity coupler is placed on a spherical ball. With heavier loads an annular drawbar eye is placed on a cylindrical pintle. The use of these two types of trailer couplings is not mutually exclusive, however, and in some applications it is desirable to accommodate both types of coupler elements on the same vehicle. While it is possible to place two trailer couplings on a vehicle, doing so is expensive and inconvenient.

Thelin, U.S. Pat. No. 3,963,266 attempts to overcome this problem with a duplex trailer coupling that accommodated both types of coupler elements. There are two difficulties with Thelin, however, which makes it less than an ideal solution to this problem. First Thelin places the drawbar eye around the spherical ball that carries the spherical cavity coupler. This creates point loading which causes excessive wear on both the drawbar eye and the ball. Secondly, the latch used by Thelin to prevent the drawbar eye from being displaced from the trailer coupling pivots about a horizontal axis. Thus the latch has to be raised to displace it from the ball in order to install or remove the drawbar eye or to use the trailer coupling with a spherical cavity coupler. In many applications there is not sufficient room to accommodate a trailer coupling of this type. Furthermore, when the device is used on a pickup truck, lowering the tailgate when the latch is in its raised position will cause the tailgate to hit the latch, potentially causing damage to both the latch and the tailgate. In addition, while the latch in Thelin prevents the drawbar eye from being displaced from the coupling element it does not prevent it from moving up and down relative to the ball. Since the ball is sized to snugly receive the drawbar eye, as the eye raises or lowers on the ball excessive clearance is created which causes excessive wear, and may create shock loading that could shatter the ball or eye.

The subject invention overcomes the foregoing problems with the prior art by providing a trailer coupling having a body that is attachable to a flat surface at the back of a towing vehicle. An arm located at the lower portion of the body projects rearwardly from the vehicle and has a coupler-receiving element attached to it. Preferably the coupler-receiving element is removably attached to the arm, and in a preferred embodiment this is accomplished by placing a threaded stud at the bottom of the coupler element through a hole in the arm and installing a nut on the stud. The upper portion of the coupler element is a spherical ball which is configured to receive a standard spherical cavity coupler. A cylindrical neck, which is configured to receive a standard drawbar eye, extends between the ball and the arm.

A latch, which is attached to the body, pivots about a vertical axis between a closed position where it contacts the coupler element and an open position where it is displaced from the coupler element. When the latch is in its open position the ball is exposed and the trailer coupling can be used with a spherical cavity coupler. Also when the latch is in its open position a drawbar eye can be placed on the coupler-receiving element. Once the drawbar eye is in place on the coupler-receiving element, the latch is moved to its closed position to prevent the drawbar eye from becoming displaced. The latch also holds the drawbar eye down on the neck where there is a large contact area, and wear is reduced.

In a preferred embodiment of the invention, the latch includes a locking element which positively locks the latch in its closed position and prevents free rotation of the latch out of its open position. The locking element is released by raising a trigger that is accessible through a finger-receiving cavity in the latch.

Accordingly, it is a principal object of the subject invention to provide a trailer coupling that receives both a spherical cavity coupler and a drawbar eye.

It is a further object of the subject invention to provide such a trailer coupling having a latch, that prevents inadvertent removal of the drawbar eye, which moves between its open and closed position by pivoting about a vertical axis.

It is a still further object of the subject invention to provide such a trailer coupling having a locking mechanism associated with the latch which positively locks the latch in its closed position and holds it from inadvertently being rotated out of its open position.

It is a further object of the subject invention to provide such a trailer coupling that utilizes a finger-operated trigger to release the locking mechanism when the latch is in its closed position.

It is a yet further object of the subject invention to provide such a trailer coupling in which the latch mechanism never needs to be raised substantially above the top of the ball that receives the spherical cavity coupler.

It is a yet further object of the subject invention to provide such a trailer coupling that has a replaceable coupler-receiving element that receives both the spherical cavity coupler and the drawbar eye.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view of a trailer coupling embodying the subject invention, with its latch mechanism in a closed position.

FIG. 2 is a plan view of the trailer coupling of FIG. 1, with its latch in an open position.

FIG. 3 is a side elevation view, similar to FIG. 1, at an enlarged scale and partially broken away to show hidden detail.

DETAILED DESCRIPTION OF A PREFERRED EMBODIMENT

Referring to FIGS. 1 and 2 of the drawings, a preferred embodiment of a trailer coupling of the subject invention includes a body 10 having a flange 12 which abuts a flat rear panel 14 of a vehicle. A series of aligned openings (not shown) extend through the flange 12 and panel 14, and bolts 16 extend through the openings to secure the hitch to the vehicle. The body 10 preferably is cast iron in order to provide a high strength, integral unit.

The lower portion of the body defines a rearwardly-projecting arm 16 that has an opening extending through its extremity. The upper portion of the body 10 is generally rectangular in cross section and has flat vertical sides 18, a flat vertical front face 20, and a flat horizontal top surface 22. The edges 24 between the front face 20 and the sides 18 are smoothly rounded. A lip 26 extends rearwardly from the flange over the upper portion of the body so that a first cavity 28 is formed between the lip 26 and the top surface 22. A rectangular notch 30 extends vertically along the upper margin of the front face 20. A second cavity 32, which extends medially into the upper portion of the body below the first cavity, opens out of the front of the body. A cylindrical bore 34 extends through the lip and the upper portion of the body into the second cavity 32.

A coupler-receiving element 36 extends upwardly from the arm 16. Located at the top of the coupler-receiving element 36 is a spherical ball 38 that is sized to mate with a specific size of coupler cavity. Typically the ball has a nominal diameter of 2 inches or 2-5/16 inches. Located below the ball 38 is a cylindrical neck 40 that receives a drawbar eye 42. Typically the neck has a 2-inch diameter. Located below the neck is a threaded stud 44 that extends through the opening in the arm 16. A nut 46 engages the stud to secure the coupler-receiving element to the arm.

A latch 48 that extends rearwardly from the upper portion of the body 10 has a cylindrical mounting tang 50 that fits in the first cavity 38. The rearward surface 51 of the latch 48 is arcuate and mates with the ball 38. Its upper surface is also arcuate and preferably does not extend above the top of the ball a significant amount. A hole 52 in the tang 50 is aligned with the bore 34. A bolt 54, that extends through the bore 34 and hole 52, terminates in the second cavity 32. A nut 56, located in the second cavity, engages the bottom of the bolt 54. The bolt acts as a vertical axis "A" about which the latch rotates between a closed position, where it engages the ball 38, FIGS. 1 and 3, and an open position, where it is removed from the ball and faces sideways. In the closed position the latch engages the drawbar eye 42 and holds it in place on the neck 40. A projection 55 extends downwardly from the latch and fits into the eye 42 to hold it against the arm 16. In the open position the drawbar eye can be installed or removed from the neck or the ball can be used to carry a spherical cavity coupler (not shown).

Referring now particularly to FIG. 3, located in the latch 48 is a cavity 58 that receives an L-shaped lock element 60 that is rotatably mounted proximate its center on a pin 62 that extends through the latch. One leg of the lock element is a trigger 64 that extends into a finger-receiving opening 66 in the latch. The other leg is a catch 68 that is sized to fit in the notch 30 when the latch is in its closed position. The lock element 60 has a lip 70 that extends forwardly from the pin 62 and overlies the top surface 22. A spring 72 fits between the lip 70 and the top surface 22 to urge the catch 68 toward the upper portion of the body. Thus, the latch cannot be moved out of its closed position unless the operator places a finger into the finger opening 66 and raises the trigger 64 to pull the catch 68 out of the notch 30. When the latch is in its open position the spring urges the catch 68 against the side 18. Because the axis A is closer to the side 18 at the point where the catch 68 strikes it when the latch is in its open position than at any other point, movement of the latch away from its open position is resisted by the spring 72. Thus, the spring holds the latch in its open position.

When the trailer coupling is to be used with a spherical cavity coupler the trigger 64 is lifted and the latch 48 is rotated to its open position. The coupler is then installed on the ball 38 in the normal manner. The force of the spring 72 urging the catch 68 against the side wall 18 of the upper portion of the body prevents the latch from swinging back against the coupler when the vehicle is driven.

To use the trailer coupling with a drawbar eye 42, the latch is moved to its open position and the eye is placed over the ball 38 and onto the neck 40. The latch is then moved back to its closed position where its rearward surface 51 contacts the ball to prevent the eye from being removed from the coupling element 36. The projection 55 on the latch holds the eye on the neck 40 where it has a large surface to rub against and thus there is uniform wear on the neck and the eye. The catch 68 is urged into the notch 30 by the spring 72 so the latch cannot be moved from its closed position without first raising the trigger. This ensures that the latch is not inadvertently opened and the eye displaced from the coupling element in use.

Since the latch rotates about a vertical axis it never has to be lifted and thus does not project significantly above the top of the ball in any orientation. This permits the trailer coupling to be used in tight locations where there is little room.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A trailer coupling for receiving both a drawbar eye and a spherical cavity coupler comprising:
   (a) a body;
   (b) means for attaching said body to a towing vehicle;
   (c) said body including a rearwardly projecting arm;
   (d) a coupler-receiving element that extends upwardly from said arm, said coupler-receiving element including a lower cylindrical neck that receives a drawbar eye and an upper spherical ball that receives a spherical cavity coupler;
   (e) a latch pivotally mounted to said body for movement about a vertical axis between a closed position where it engages said coupler-receiving element and prevents displacement of the drawbar eye from said cylindrical neck and an open position where it is DISPLACER from said coupler-receiving element to permit a spherical cavity coupler to be placed on said spherical ball; and
   (f) wherein said latch includes means for holding said drawbar eye snugly against said arm.

2. The trailer coupling of claim 1, including means for releasably attaching said coupler-receiving element to said arm.

3. The trailer coupling of claim 1 wherein said latch is shaped such that it does not project substantially above said spherical ball in either its open or closed positions.

4. The trailer coupling of claim 1, including locking means for preventing inadvertent movement of said latch from its open and closed positions.

5. The trailer coupling of claim 4 wherein said locking means comprises:
   (a) said latch having a cavity defined therein:

(b) a lock element rotatably mounted in said cavity having a trigger portion and a catch portion;
(c) said body having a detent defined therein;
(d) biasing means for urging said catch portion into said detent when said latch is in its closed position; and
(e) said latch element being mounted in a manner such that displacement of said trigger overcomes said biasing means and lifts said catch portion out of said detent.

6. The trailer coupling of claim 5 wherein said body includes a side wall that is contacted by said catch portion when said latch is in its open position to prevent said latch from freely rotating toward its closed position.

* * * * *

UNITED STATES PATENT AND TRADEMARK OFFICE
CERTIFICATE OF CORRECTION

PATENT NO. : 5,312,128
DATED : May 17, 1994
INVENTOR(S) : Rocky A. Blacklaw

It is certified that error appears in the above-indentified patent and that said Letters Patent is hereby corrected as shown below:

Column 4, Line 52: delete "DISPLACER" insert --displaced--

Signed and Sealed this

Tenth Day of January, 1995

Attest:

BRUCE LEHMAN

Attesting Officer                Commissioner of Patents and Trademarks